United States Patent
Plummer et al.

(10) Patent No.: US 10,227,519 B2
(45) Date of Patent: Mar. 12, 2019

(54) WELLBORE FLUIDS AND METHOD OF USE

(71) Applicants: Daniel T. Plummer, Lake Charles, LA (US); Christian Jones, Sulphur, LA (US); Jorge M. Fernandez, Lake Charles, LA (US)

(72) Inventors: Daniel T. Plummer, Lake Charles, LA (US); Christian Jones, Sulphur, LA (US); Jorge M. Fernandez, Lake Charles, LA (US)

(73) Assignee: Sasol Performance Chemicals GmbH, Hamburg (DE)

( * ) Notice: Subject to any disclaimer, the term of this patent is extended or adjusted under 35 U.S.C. 154(b) by 0 days.

(21) Appl. No.: 14/429,997

(22) PCT Filed: Sep. 24, 2013

(86) PCT No.: PCT/US2013/061270
§ 371 (c)(1),
(2) Date: Mar. 20, 2015

(87) PCT Pub. No.: WO2014/047600
PCT Pub. Date: Mar. 27, 2014

(65) Prior Publication Data
US 2015/0225637 A1  Aug. 13, 2015

Related U.S. Application Data

(60) Provisional application No. 61/704,794, filed on Sep. 24, 2012.

(51) Int. Cl.

| | |
|---|---|
| *C09K 8/64* | (2006.01) |
| *C09K 8/02* | (2006.01) |
| *C09K 8/035* | (2006.01) |
| *C09K 8/32* | (2006.01) |
| *C09K 8/52* | (2006.01) |
| *C09K 8/62* | (2006.01) |
| *C09K 8/80* | (2006.01) |
| *E21B 7/00* | (2006.01) |
| *E21B 43/04* | (2006.01) |
| *E21B 43/26* | (2006.01) |

(52) U.S. Cl.
CPC ............... *C09K 8/02* (2013.01); *C09K 8/035* (2013.01); *C09K 8/32* (2013.01); *C09K 8/52* (2013.01); *C09K 8/62* (2013.01); *C09K 8/64* (2013.01); *C09K 8/80* (2013.01); *E21B 7/00* (2013.01); *E21B 43/04* (2013.01); *E21B 43/26* (2013.01)

(58) Field of Classification Search
CPC ...... C09K 2208/34; C09K 8/035; C09K 8/34; C09K 8/32; C09K 15/02; C09K 21/02; C09K 5/10; C09K 8/64; C09K 8/60; C09K 8/36; C09K 8/04; C09K 8/18; Y10S 507/905; E21B 7/00; E21B 21/065; E21B 21/068; E21B 21/00
See application file for complete search history.

(56) References Cited

U.S. PATENT DOCUMENTS

| | | |
|---|---|---|
| 4,552,215 A | 11/1985 | Almond et al. |
| 4,553,601 A | 11/1985 | Almond et al. |
| 5,189,012 A | 2/1993 | Patel et al. |
| 5,635,457 A * | 6/1997 | Van Slyke ............... C09K 8/34 507/103 |
| 6,255,256 B1 * | 7/2001 | Van Slyke ............... C09K 8/34 507/103 |
| 6,562,230 B1 | 5/2003 | O'Rear et al. |
| 2005/0077209 A1 | 4/2005 | Miller et al. |
| 2006/0196807 A1 | 9/2006 | Rosenbaum et al. |
| 2009/0137435 A1 | 5/2009 | Hilker et al. |
| 2010/0204067 A1 * | 8/2010 | Hoskins ............... C10M 143/00 507/138 |

OTHER PUBLICATIONS

The manual entitled "OFITE: EP (Extreme Pressure) and Lubricity Tester" Apr. 11, 2011.*
OFI Testing Equipment, Inc. "OFITE: EP and Lubricity Tester" Instruction Manual 11, Apr. 2011—www.ofite.com/instructions/111-00.pdf, p. 2.

* cited by examiner

*Primary Examiner* — Kumar R Bhushan
(74) *Attorney, Agent, or Firm* — Bushman Werner, P.C.

(57) ABSTRACT

A base fluid for formulating wellbore fluids. The base fluid comprises a mixture of synthetic aliphatic hydrocarbons derived from a Fischer-Tropsch product stream and contains greater than 96% aliphatic hydrocarbons having a carbon number range of from C6 to C30. The percentage of homologues having a carbon number of C10 or less is less than about 3 wt %.

19 Claims, 4 Drawing Sheets

WELLBORE FLUIDS AND METHOD OF USE

CROSS REFERENCE TO RELATED APPLICATION

This application claims is a national phase application of PCT/US13/61270, filed Sep. 24, 2013, which claims priority to U.S. Application No. 61/704,794 filed on Sep. 24, 2012, the disclosures of which are incorporated herein by reference for all purposes.

BACKGROUND OF THE INVENTION

Field of the Invention

The present invention relates to hydrocarbon fluids, particularly hydrocarbon fluids for formulating wellbore fluids used in oil and gas well operations such as drilling, hydraulic fracturing, gravel packing, as well as numerous other downhole operations.

Description of the Prior Art

In the process of drilling a well into an oil and gas bearing formation, a drilling fluid or "mud" is pumped into the developing wellbore through the drill pipe and exits through nozzles in the rotating drill bit mounted at the end of the drill pipe. The drilling fluid is then circulated back to the surface through the annulus, the space between the drill pipe and the wall of the wellbore. Back at the surface, solids are removed and the mud is pumped to a fluid tank where it can be reused or treated if necessary. The drilling fluid system is typically designed as a loop with the drilling fluids continually circulating as the drill bit rotates. Drilling fluid performs several functions essential to the successful completion of an oil or gas well and enhances the overall efficiency of the drilling operation. Drilling fluid is used, for instance, to cool and lubricate the rotating drilling tool, to reduce friction between the bit and the wellbore, to prevent sticking of the drill pipe, to control subsurface pressure in the wellbore, to lift the drill cuttings and carry them to the surface, and to clean the wellbore and drilling tool.

The major component of drilling fluid is its base fluid. A drilling fluid may be aqueous based, hydrocarbon based, synthetic based, or an emulsion, such as an oil-in-water or water-in-oil ("invert") emulsion. Aqueous based, or water based, drilling fluids are used frequently in the industry. They provide an economic advantage over oil based drilling fluids and are also more environmentally friendly. However, for certain formations, drilling with aqueous based fluids can be problematic due to wellbore instability caused by the swelling of water-absorbing rock and clay in the formation, hydration of which can be greatly reduced by using an oil based drilling fluid. Although oil based fluids are more costly than aqueous based fluids, they are generally preferred for deep drilling, high temperature drilling or when a substantially non-reactive base fluid is required for a particular drilling operation or formation. Oil based fluids tend to provide more natural lubrication than water based fluids and achieve greater increases in drilling progress, or increased rates of penetration (ROP).

The better lubricity afforded by hydrocarbon based fluids decreases undesirable torque and drag and is especially important in highly deviated wells e.g., in horizontal wells where friction is a major concern. Horizontal drilling has become increasingly important, particularly in North America in so-called shale plays. In fact, a recent industry publication suggested that in the United States, six of every ten active rigs were drilling horizontally in any given week. Accordingly, even though hydrocarbon based fluids are more expensive, the results they achieve in turns of ROP, reduced torque and drag makes them economically attractive in horizontal drilling.

SUMMARY OF THE INVENTION

In one aspect, the present invention provides a nonaqueous base fluid for the formulation of drilling fluids, hydraulic fracturing (fracking) fluids, and other fluids used in wellbore applications, e.g., clean out, stimulation, etc.

In another aspect, the present invention provides a nonaqueous base fluid for use in wellbore fluids which is derived from a Fischer Tropsch product stream.

In a further aspect, the present invention provides a nonaqueous base fluid for use in formulating wellbore fluids which exhibits a lubricity coefficient of less than about 0.17.

Still a further aspect of the present invention is a base fluid for formulating wellbore fluids comprised substantially of aliphatic hydrocarbons having less than about 3.00 wt % of hydrocarbons having a carbon number content of C10 or less.

In yet another aspect, the present invention provides a method of conducting wellbore operations.

These and further features and advantages of the present invention will become apparent from the following detailed description, wherein reference is made to the figures in the accompanying drawings.

DETAILED DESCRIPTION OF PREFERRED EMBODIMENTS

The base fluid of the present invention comprises a mixture of at least about 96% by weight of synthetic aliphatic hydrocarbons, primarily linear and branched, derived from a Fischer-Tropsch (FT) product stream, the base fluid having a carbon number range of from about C6 to about C30, preferably from about C8 to about C26, wherein less than about 3 wt % of the hydrocarbon are C10 homologues and the percentage of homologues having a carbon number of C9 and less will be less than about 0.2 wt %, most preferably below about 0.1 wt %. Generally the hydrocarbons will be about 50 wt % or greater branched, primarily methyl branched. Preferably, the base fluid has less than about 0.35 wt % hydrocarbons having a carbon number of C9. The base fluid will have a lubricity coefficient of 0.17 or less, preferably below about 0.15 or less, even more preferably below 0.12 or less. Lubricity coefficient is defined as the coefficient of friction of a metal ring rotating in the drilling fluid at 60 rpm against a hardened metal surface at 150 psi (1,034,200 Pa). The test can be conducted on an Extreme Pressure (EP) and Lubricating Tester, Model # 112-00 available from OFI Testing Equipment, Inc. The test is designed to simulate the speed of rotation of the drill pipe and the pressure with which the pipe bears against the wall of the borehole.

The hydrocarbon base fluid of the present invention is preferably a Fischer Tropsch product stream (referred to hereafter as FT distillate) having a flash point of about 150° F. or greater.

Desirably, the base fluid of the present invention will have an aromatic content of less than about 0.3 wt %, preferably less than about 0.2 wt %, most preferably less than about 0.1 wt %.

Figure 1:
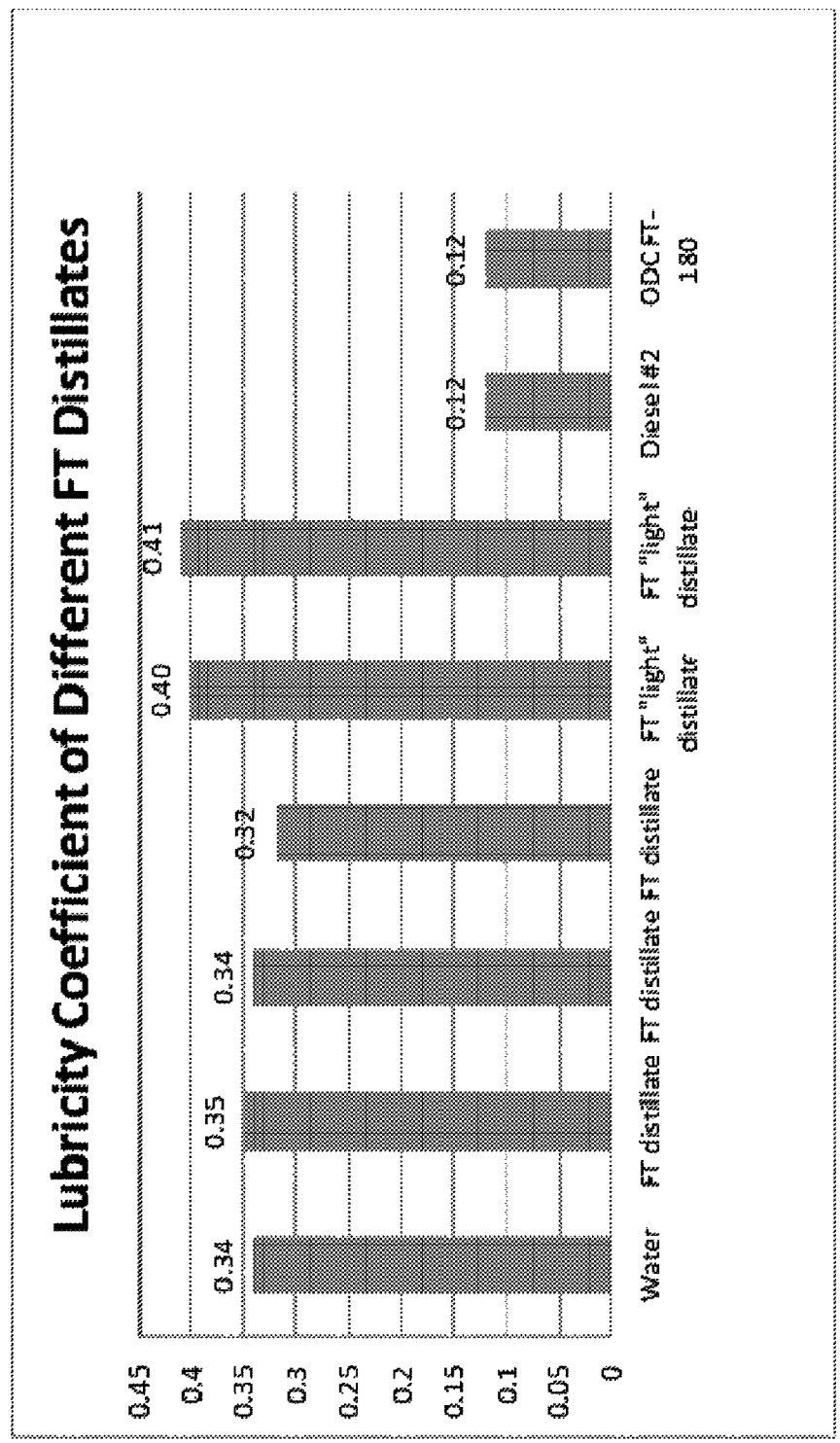
FIG. 1 is a bar graph showing the lubricity coefficient of various liquids.

Referring to FIG. 1, there is shown a bar graph comparing the lubricity coefficients of various liquids including water, various distillates from the product stream of a Fischer Tropsch facility, and petroleum diesel derived from a typical refinery operation. As can be seen, the three FT distillates all have lubricity coefficients above about 0.3. There are also shown two FT "light" distillates which basically are lower-boiling fractions of FT distillates. These latter materials have lubricity coefficients at above about 0.4.

Table 1 below shows the carbon number distribution of the homologues in the FT "light" distillates referenced in FIG. 1. As can be seen, there are significant amounts of paraffins having carbon numbers of C10 and lower.

TABLE 1

| Carbon # | Linear Paraffin | Methyl Branched | Other Branched | Total |
|---|---|---|---|---|
| C7 | 0.03 | 0.00 | 0.00 | 0.03 |
| C8 | 2.76 | 0.21 | 0.01 | 2.98 |
| C9 | 24.64 | 4.66 | 1.03 | 30.33 |
| C10 | 41.58 | 11.15 | 5.53 | 58.26 |
| C11 | 0.19 | 2.28 | 5.47 | 7.95 |
| C12 | 0.04 | 0.00 | 0.08 | 0.12 |
| C13 | 0.07 | 0.08 | 0.06 | 0.21 |
| C14 | 0.01 | 0.01 | 0.04 | 0.06 |
| C15 | 0.01 | 0.00 | 0.00 | 0.01 |
| C16 | 0.01 | 0.00 | 0.00 | 0.01 |
| C17 | 0.01 | 0.00 | 0.00 | 0.01 |
| Totals | 69.35 | 18.39 | 12.22 | 99.95 |

The Diesel #2, a typical petroleum diesel, referenced to in FIG. 1 has a lubricity coefficient of about 0.12. Lastly, a typical FT distillate, which has been distilled to a flash point of around 180 °F., identified as ODC FT-180, has a lubricity coefficient of 0.12, essentially the same as that of petroleum diesel. Although the lubricity coefficient of a typical petroleum diesel and the FT derived ODC FT-180 are essentially the same, because of the lower aromatic content of the ODC FT-180 and the environmental benefits associated therewith, the latter is a decidedly more desirable base fluid for drilling or other wellbore fluids than typical petroleum diesel.

Figure 2:
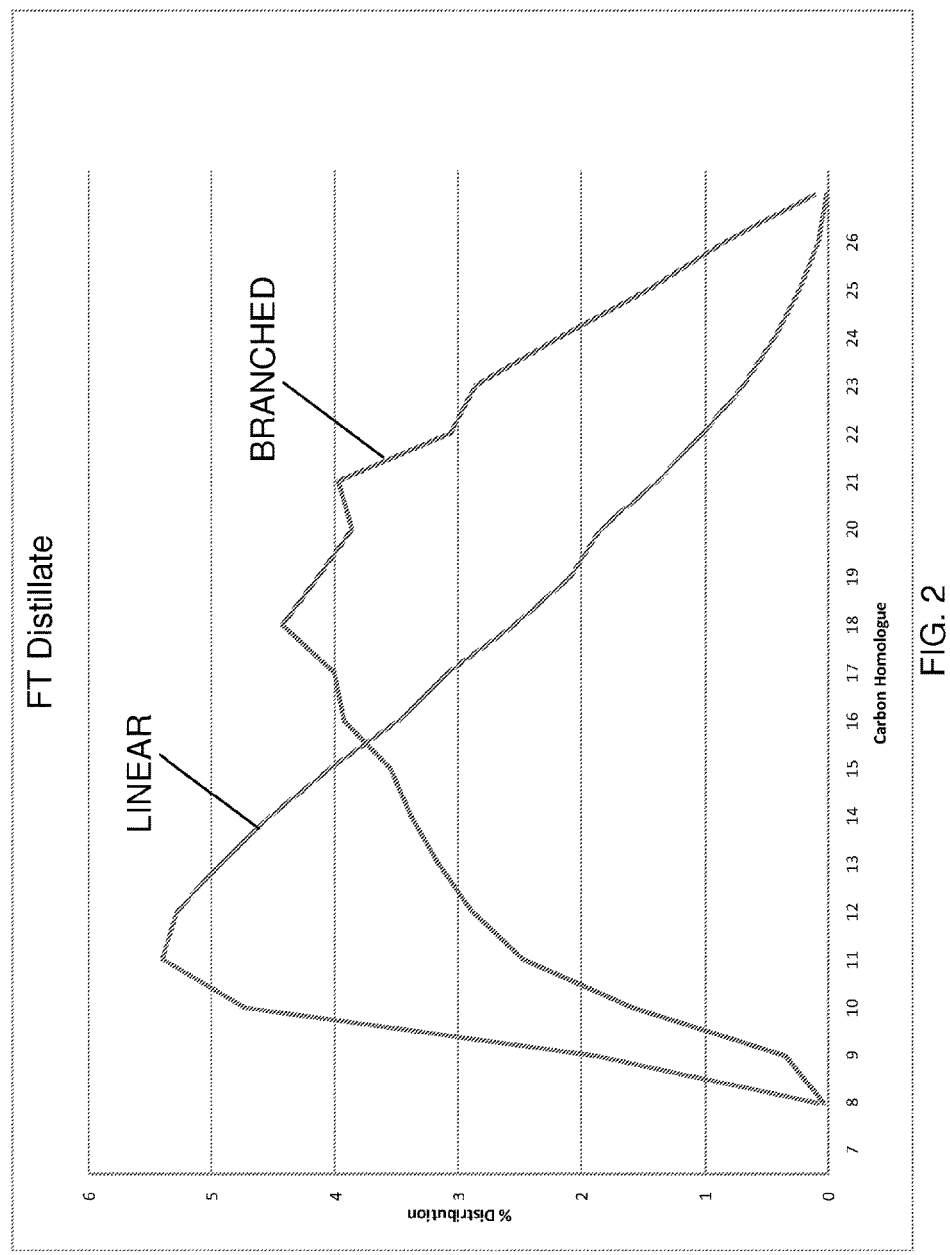
FIG. 2 is a graph showing the carbon homologue distribution both as to linear and branched hydrocarbons in a typical FT distillate.

With respect to the FT distillates referenced to in FIG. 1, reference is now made to Table 2 and FIG. 2 to show the homologue breakdown of a typical FT distillate. As can be seen from Table 2 and FIG. 2, the FT distillate has significant amounts of homologues having carbon numbers of C10 or less. This is to be compared with Table 3 and FIG. 3 which shows that if the FT distillate of Table 2 and FIG. 2 is distilled to a flash point of around 180 °F., the content of homologues having C10 or less carbons is dramatically reduced. Unexpectedly, it was found that by reducing the content of the lower carbon number homologues, i.e., 010 and less and particularly the C9 and lower carbon number content, the lubricity coefficient was dramatically reduced. In fact, as can be seen from FIG. 1, the lubricity coefficient of the ODC FT-180 is roughly a third of the lubricity coefficient of the FT distillate.

TABLE 2

| FTC Distillate | | | |
|---|---|---|---|
| CARBON NUMBER | Linear | Branching | Total |
| 7 | 0.09 | 0.03 | 0.12 |
| 8 | 1.89 | 0.34 | 2.23 |
| 9 | 4.73 | 1.58 | 6.30 |
| 10 | 5.40 | 2.48 | 7.87 |
| 11 | 5.28 | 2.89 | 8.17 |
| 12 | 4.92 | 3.17 | 8.09 |
| 13 | 4.51 | 3.38 | 7.89 |
| 14 | 4.04 | 3.55 | 7.59 |
| 15 | 3.48 | 3.92 | 7.41 |
| 16 | 3.08 | 4.01 | 7.09 |
| 17 | 2.55 | 4.42 | 6.97 |
| 18 | 2.09 | 4.14 | 6.23 |
| 19 | 1.85 | 3.87 | 5.72 |
| 20 | 1.39 | 3.97 | 5.36 |
| 21 | 1.02 | 3.06 | 4.08 |
| 22 | 0.68 | 2.85 | 3.53 |
| 23 | 0.43 | 2.18 | 2.61 |
| 24 | 0.23 | 1.46 | 1.69 |
| 25 | 0.08 | 0.84 | 0.92 |
| 26 | 0.01 | 0.11 | 0.12 |
| Total | 47.75 | 52.24 | 99.98 |

TABLE 3

| ODC FT-180 | | | |
|---|---|---|---|
| CARBON NUMBER | Linear | Branched | Total |
| 7 | 0.0% | 0.0% | 0.0% |
| 8 | 0.0% | 0.0% | 0.0% |
| 9 | 0.0% | 0.0% | 0.0% |
| 10 | 2.5% | 0.4% | 2.8% |
| 11 | 5.5% | 2.5% | 8.0% |
| 12 | 5.9% | 3.8% | 9.7% |
| 13 | 5.6% | 4.1% | 9.7% |
| 14 | 4.9% | 4.5% | 9.4% |
| 15 | 4.3% | 4.8% | 9.1% |
| 16 | 3.5% | 5.0% | 8.6% |
| 17 | 3.0% | 5.0% | 8.0% |
| 18 | 2.5% | 5.0% | 7.5% |
| 19 | 1.9% | 5.1% | 6.9% |
| 20 | 1.6% | 4.5% | 6.1% |
| 21 | 1.1% | 3.7% | 4.9% |
| 22 | 0.8% | 3.0% | 3.8% |
| 23 | 0.5% | 2.3% | 2.8% |
| 24 | 0.3% | 1.5% | 1.8% |
| 25 | 0.1% | 0.7% | 0.8% |
| 26 | 0.0% | 0.1% | 0.1% |
| Total | 43.9% | 56.1% | 100.0% |

Figure 3:
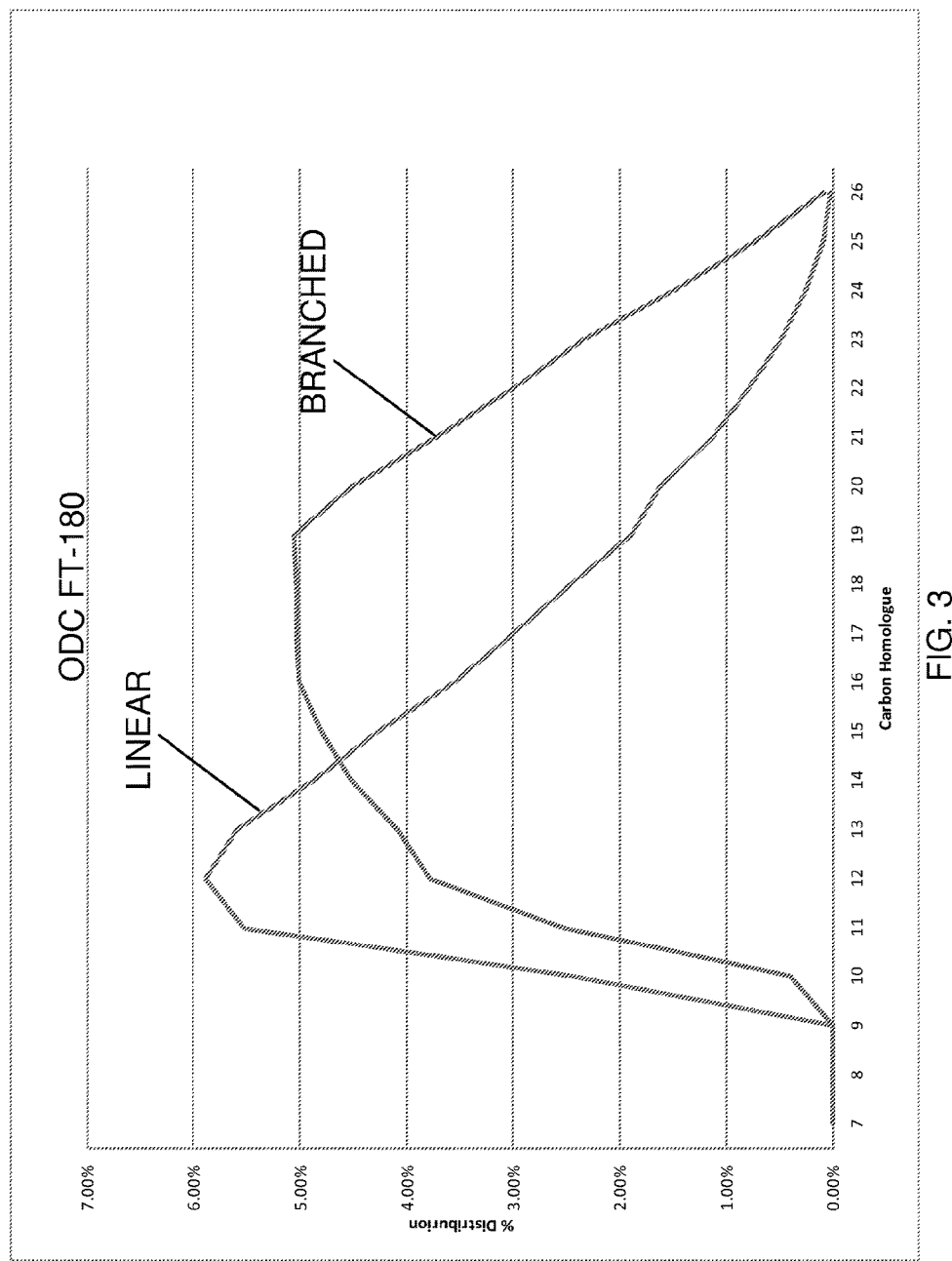
FIG. 3 is a graph similar to FIG. 2 but showing the distillate of FIG. 2 which has been distilled to a flash point of around 180° F.

As can be seen from FIG. 3, there is a significant linear component to the ODC FT-180. It is contemplated within the scope of the present invention that, in fact, the base fluid of the present invention could have a much larger branched component and in fact may, in certain cases, be desirably substantially all branched.

Table 4 below shows a comparison between an FT distillate, an FT "topped" distillate, and ODC FT-180 as to flash point, lubricity coefficient and C8-C11 content. In this regard an FT "topped" distillate is an FT distillate from which light ends have been removed.

TABLE 4

| Sample | Flash (° F.) | Lubricity Coefficient | C8 | C9 | C10 | C11 |
|---|---|---|---|---|---|---|
| FT distillate | 140 | 0.34 | .012 | 2.23 | 6.30 | 7.87 |
| FT "topped" distillate | 170 | 0.14 | 0.00 | 0.14 | 5.93 | 8.21 |
| ODC FT-180 | 180 | 0.12 | 0.00 | 0.00 | 2.80 | 8.00 |

As can be seen from Table 4, FT distillate has a higher lubricity coefficient as compared with FT "topped" distillate and ODC FT-180, the latter two being quite low. As can also be seen, the FT distillate contains significantly more C8-C10 content than either of the FT "topped" distillate or the ODC FT-180. Significantly, the ODC FT-180 contains substantially no C8 and C9 and significantly less C10 than the topped distillate. Table 4 clearly demonstrates that a higher content of C8-C10 homologues is deleterious vis-à-vis the lubricity coefficient.

Figure 4:
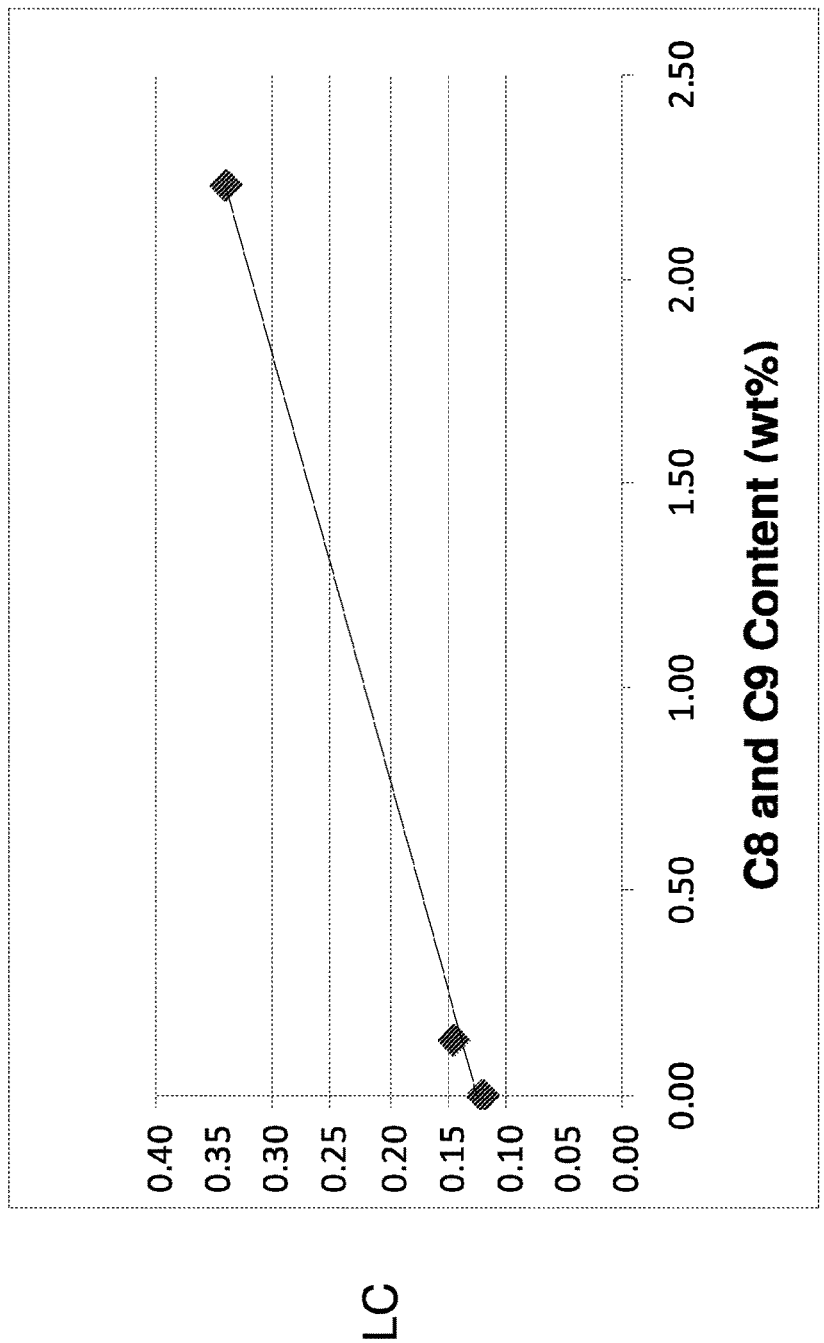
FIG. 4 is a graph of lubricity coefficient versus C8 and C9 content.

FIG. 4 demonstrates, graphically, that reducing the C8 and C9 content results in lowering of the lubricity coefficient. Thus, as shown in FIG. 4, when the C8 and C9 content exceeds about 0.2%, the lubricity coefficient rises to about 0.15.

The base fluid of the present invention as described above can be used to formulate synthetic, oil based drilling fluids which are environmentally friendly, achieve greater ROP, result in reducing torque and drag on the drill string and are particularly desirable in horizontal drilling. Further, the base fluid of the present invention can be used in fracking fluids and other wellbore fluids where reduced friction, formation composition, and environmental factors are of concern.

In formulating a wellbore fluid for use in treating a wellbore, various additives or agents are used with the base fluid. Such additives include, without limitation, emulsifiers, wetting agents, viscosifiers, weighting agents, fluid loss control agents, proppants, and particulate agents for forming gravel packs. It will be readily understood by those skilled in the art that in certain cases more than one of the additives listed above can be used in a given wellbore fluid for conducting a particular wellbore operation. For example, in the case of a drilling fluid, it would be common to include a weighting agent as well as a fluid loss control agent. In the case of hydraulic fracturing, which is commonly used now in tight shale formations, proppants are normally used to ensure that once the formation has been fractured, the fissures are kept open, e.g., propped open, by the use of the propping agent. Additives such as emulsifiers, wetting agents, etc. can also be used in certain drilling and other wellbore fluids, again depending on downhole conditions in the formation and the goal to be achieved.

It will be understood by those skilled in the art that the amount of additive employed in a given wellbore formulation will vary widely depending upon the nature of the formation traversed by the wellbore and other well known factors.

Typically, a wellbore fluid employing the base fluid of the present invention will comprise at least about 50 wt % of the base fluid and can comprise 60, 70, 80 or even 90 wt % of the base fluid. It is also contemplated that the base fluid, in certain situations, could be used as the wellbore fluid without the addition of further additives.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A base fluid for formulating wellbore fluids comprising:
a mixture of synthetic aliphatic hydrocarbons derived from a Fischer-Tropsch product stream and containing greater than 96% aliphatic hydrocarbons having a carbon number range of C6-C30, the percentage of homologues having a carbon number of C9 and less is less than 0.35 wt %, the homologues having a carbon number of greater than C10 comprise at least ten consecutive carbon numbers, said aliphatic hydrocarbons comprising a greater amount of branched hydrocarbons than linear hydrocarbons, and said fluid having a lubricity coefficient of 0.17 or less wherein lubricity coefficient is defined as the coefficient of friction of a metal ring rotating in the base fluid at 60 rpm against a hardened metal surface at 150 psi.

2. The base fluid of claim 1, wherein the lubricity coefficient is below about 0.12.

3. The base fluid of claim 1, wherein the Fischer-Tropsch product stream comprises a product stream derived from a gas-to-liquid process.

4. The base fluid of claim 3, wherein the product stream is derived from the gas-oil fraction.

5. The base fluid of claim 4, wherein the flash point of the product stream is about 180° F. or greater.

6. The base fluid of claim 1, wherein the aromatic content of said hydrocarbons is less than about 0.3 wt %.

7. A wellbore fluid comprising a base fluid according to claim 1, and at least one additive selected from the group consisting of emulsifiers, wetting agents, viscosifiers, weighting agents, fluid loss control agents, proppants, and particulate agents for forming gravel packs.

8. The wellbore fluid of claim 7, wherein said additive comprises a proppant.

9. The wellbore fluid of claim 7, wherein said additive comprises a weighting agent.

10. The wellbore fluid of claim 7, wherein the percentage of homologues having a carbon number of C9 and less is less than 0.35 wt %.

11. The wellbore fluid of claim 7, wherein the lubricity coefficient is below about 0.12.

12. The wellbore fluid of claim 7, wherein the Fischer-Tropsch product stream comprises a product stream derived from a gas-to-liquid process.

13. The wellbore fluid of claim 12, wherein the product stream is derived from the gas-oil fraction.

14. The wellbore fluid of claim 13, wherein the flash point of the product stream is about 180° F or greater.

15. The wellbore fluid of claim 7, wherein the aromatic content of said hydrocarbons is less than about 0.3 wt %.

16. A method of treating a wellbore, comprising:
introducing into said wellbore a formulation comprising the base fluid of claim 1 and an additive selected from the group consisting of emulsifiers, wetting agents, viscosifiers, weighting agents, fluid loss control agents, proppants, and particulate agents for forming gravel packs.

17. The method of claim 16, wherein said treating comprises drilling a well.

18. The method of claim 16, wherein said treating comprises fracturing a well.

19. The method of claim 16, wherein said treating comprises forming a gravel pack.

\* \* \* \* \*